Jan. 24, 1956 — C. MacSPORRAN — 2,731,802
AUTOMATIC SHUT-OFF VALVE IN LIQUEFIED GAS SYSTEM
Filed Dec. 29, 1952 — 2 Sheets-Sheet 1

INVENTOR.
C. MacSporran
BY Hudson & Young
ATTORNEYS

Jan. 24, 1956    C. MacSPORRAN    2,731,802
AUTOMATIC SHUT-OFF VALVE IN LIQUEFIED GAS SYSTEM
Filed Dec. 29, 1952    2 Sheets-Sheet 2
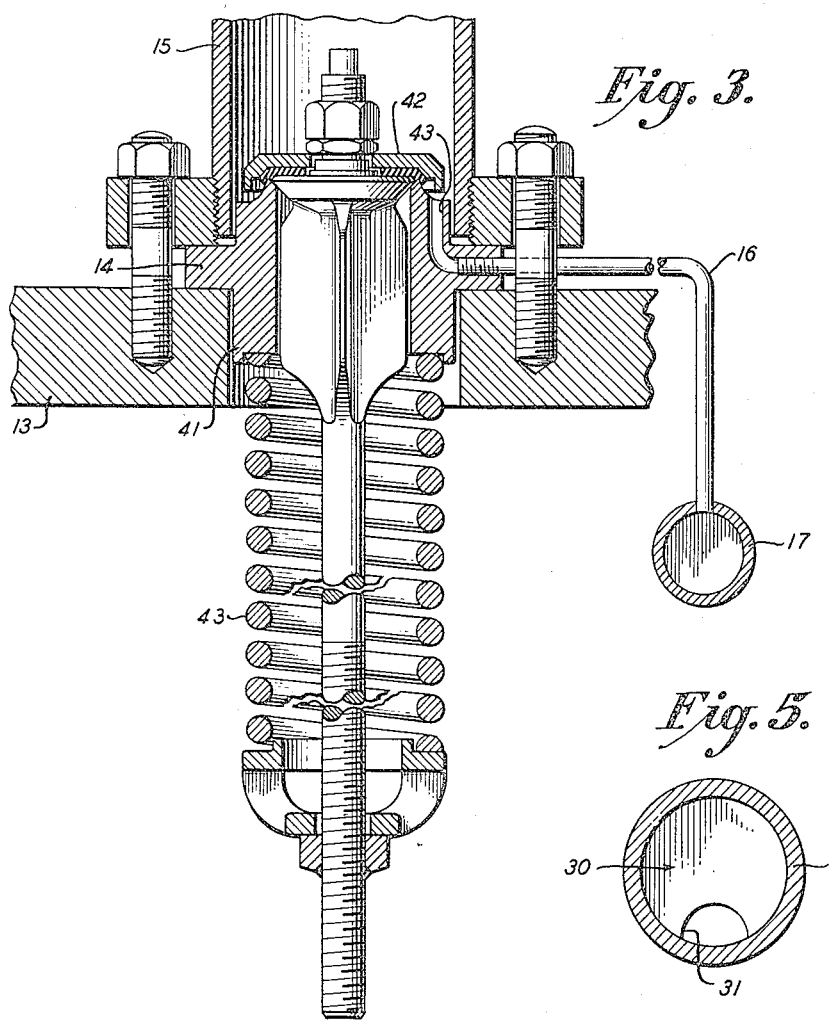
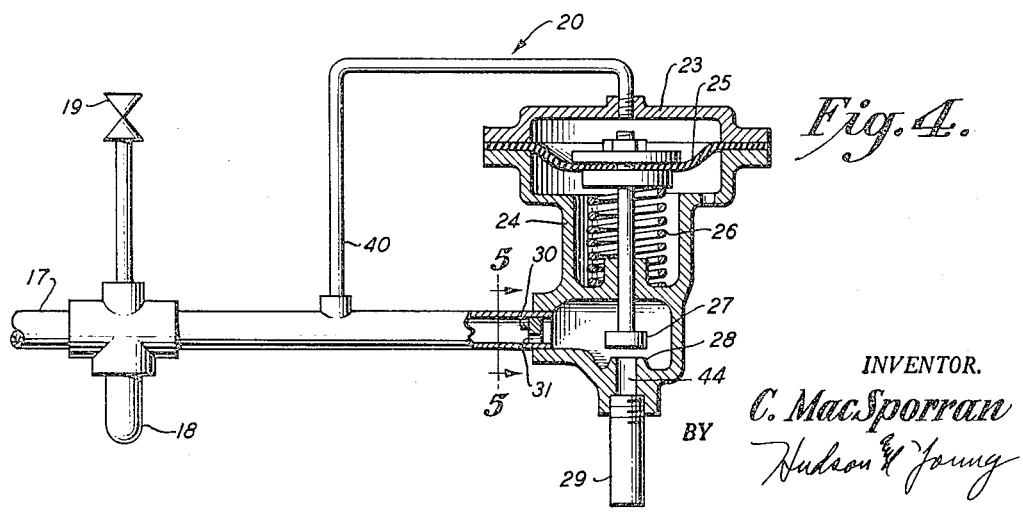
INVENTOR.
C. MacSporran
BY Hudson & Young
ATTORNEYS

United States Patent Office 2,731,802
Patented Jan. 24, 1956

2,731,802

AUTOMATIC SHUT-OFF VALVE IN LIQUEFIED GAS SYSTEM

Charles MacSporran, Bartlesville, Okla., assignor to Phillips Petroleum Company, a corporation of Delaware Application December 29, 1952, Serial No. 328,327

14 Claims. (Cl. 62—1)

This invention relates to liquefied petroleum gas storage systems. In one aspect it relates to a safety device for use in conjunction with liquefied petroleum gas storage systems.

Large relief valves used in liquefied petroleum gas storage tanks are provided with a drain hole or orifice for disposal of water, such drainage means being required by state or other regulations. Such drain holes can be dangerous in event of fire when the relief valves pop in that the flame fed by vapors flowing through the drain holes can impinge on the tank shells to weaken them and expose them to possible rupture. Flame deflectors have been considered for directing the flame from the drain holes upward and away from the tank shells, but it is preferred to prevent flames at this point by providing some automatic device which will close the drain holes the moment a relief valve pops.

One object of my invention is to eliminate at least one hazard in liquefied petroleum gas storage systems.

Another object of my invention is to provide a device for the prevention of the spread of fire to other liquefied petroleum gas storage tanks in case one or more tanks closely situated are on fire.

These and other objects of my invention will be realized upon reading the following disclosure which taken with the attached drawing forms a part of this specification.

I accomplish these and other objects and advantages by providing a motor valve for use on the outlet end of a water drain header line which is manifolded to the above-mentioned drain holes in relief valves in LPG multi-tank storage systems. The motor valve is of the type and is so arranged that upon an increase in pressure in the drainage header line the valve closes and prevents passage of any fluid from the header line. In times of fire when the pressure in a tank is abnormally high, the pressure relief valve pops and during popping of the valve gas flows through the drain hole into the header as well as through the vent stack. By providing this motor operated shut-off valve at the end of the header line, I find that upon increase of gas pressure within the header the valve quickly and completely closes against the flow of gas therethrough thereby eliminating one possible source of danger.

In the drawing,

Figure 3 is an elevational view, partly in section, of a pressure relief valve such as may be used with the apparatus of my invention.

Figure 4 is an elevational view, partly in section, of a portion of the apparatus of Figure 2.

Figure 5 illustrates, in detail, a portion of the apparatus of Figure 2 taken along the line 5—5 of Figure 4.

Figure 1:
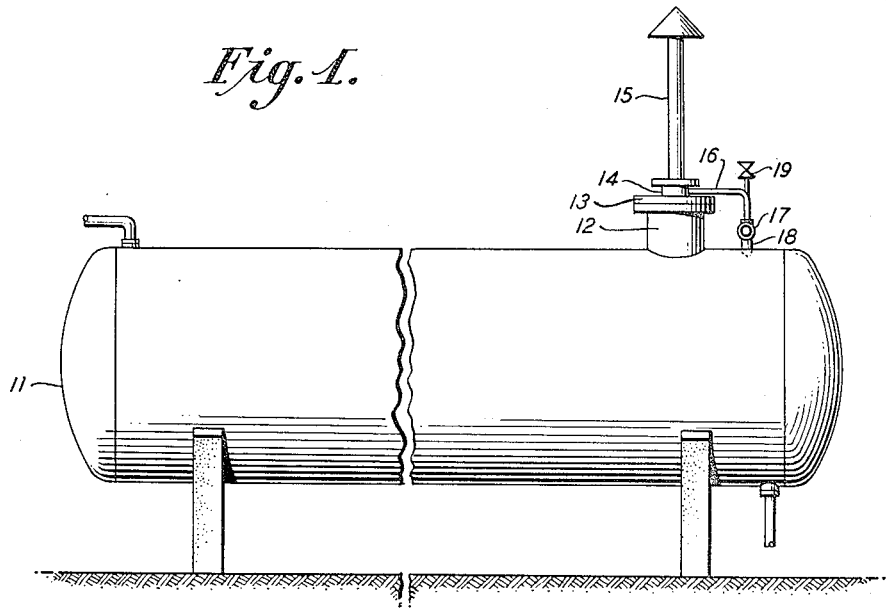
Figure 1 represents in diagrammatic form a side view of a liquefied petroleum gas storage system.

Referring now to the drawing, and specifically to Figure 1, reference numeral 11 identifies a conventional, horizontally disposed liquefied petroleum gas storage tank.

On the top of the tank is disposed a manhole 12 to which is attached a cover plate 13 carrying a pressure relief valve 14. On the top of this pressure relief valve is provided a stack 15 for disposal of the popped vapors from the tank. Tube 16 is provided as illustrated for passage of condensate water from the relief valve 14 through a collection header line 17.

Figure 2:
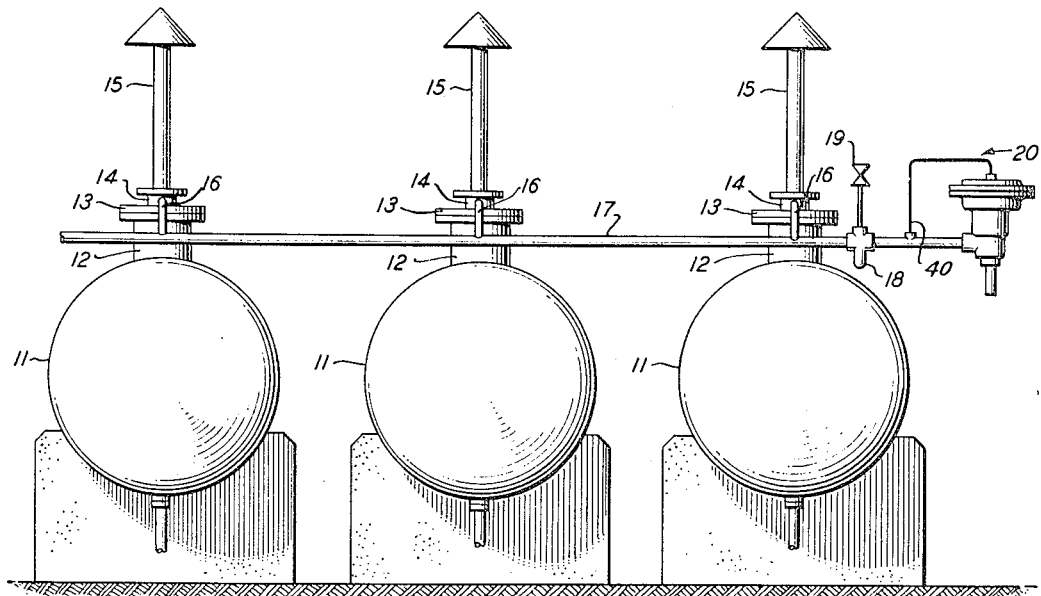
Figure 2 illustrates an end view of a battery of liquefied petroleum gas storage tanks provided with the apparatus of my invention.

In Figure 2 is illustrated an end view of such a liquefied petroleum gas storage system. In this figure several condensate drain lines 16 are shown as being connected to the header conduit 17. At a point in the header line 17 near its outlet end is provided a small reservoir 18 in which is provided such an antifreeze material as ethylene glycol to prevent freezing of the condensate water in the shut-off valve apparatus 20.

In Figure 4 is shown in detail a sectional view of this shut-off valve apparatus 20. I have illustrated this valve as a diaphragm operated valve. The valve is composed of the housing 24 carrying a diaphragm 25 held in place by a bonnet member 23. A valve 27 is held in a normally opened position under the biasing effect of a compression spring 26. When gas pressure forces the diaphragm downwardly, the valve 27 seats against a valve seat 28 to prevent flow of fluid therethrough. When the valve is in its normally open position, fluid may flow from the header line 17 through the valve into an outlet tube 29 for such disposal as desired.

In the end of the header line 17 adjacent the valve body 24 is provided a flow constricting member 30. This flow constricting member 30 is illustrated in detail in Figure 5 which is a sectional view taken on the line 5—5 of Figure 4. This flow constricting member has a small opening 31 disposed in its bottom. Opening 31 is in position to permit the free flow of condensate water at all times of normal operation of the storage system and when the valve 27 is opened from its seat 28. This opening 31 may be square, round or other form.

Figure 3 illustrates diagrammatically partly in section, a relief valve such as those normally used in conjunction with liquefied petroleum gas storage tanks. A body 41 of this valve is held rigidly in place by a collar member 13. As may be seen a valve 42 is biased in a closed position against its seat under the influence of a compression spring 43. A stack pipe 15 is provided for the carrying away of vapors when the valve pops. In one side of the valve body 41 is illustrated a drain pipe 16 connected with the walls of an opening through the valve body. This drain pipe 16 is the same drain pipe as mentioned hereinabove in relation to Figures 1 and 2. Likewise the header line 17 is the same header line as illustrated in Figures 1, 2 and 4. From the drawing it is seen that when condensate water is formed in the stack 15 it can drain downward and collect in the vicinity of the valve and, as mentioned above, in cold weather this water may freeze and prevent proper operation of the valve. Accordingly, this drain hole 43 is provided for disposal of this condensate water. According to my invention I provide the lines 16 and 17 for disposal of the condensate water to a point removed from the pop-off valve and tank.

It has been found that at times when the valve 42 opens and releases pressure from within the liquefied petroleum gas storage tank, gas flows through the drain opening 43, the drain pipe 16 and the header pipe 17 and out of the condensate disposal line 29. I find that by providing a flow restricting member, such as member 30, that the flow of gas is greatly restricted through the relatively small opening 31 and to such an extent that pressure is built up on the upstream side of this member. It is intended that when pressure is built up on the upstream side of member 30 this pressure is transmitted through conduit 40, and against the top of diaphragm 25 in the valve assembly 20. This increased pressure pushes the diaphragm 25 downward and closes valve 27 against its seat 28. When valve 27 is held tightly against its seat 28, all flow of combustible vapors through the drain line 29 is stopped and one possible source of fire is eliminated.

When the relief valve closes and the gas vents to the atmosphere from the stack 15, gas from header 17 vents through pressure built up in line 16 and the header tube 16 into the stack and atmosphere. When this pressure is then relieved from the header line 17, the pressure above the diaphragm 25 is reduced and the valve 27 opens. At this time any condensate which forms in stack pipe 15 may drain through the drain 43, the conduit 16, the header line 17 and passes on through the opening 31 of the flow restricting member 30 and through the valve 28 for disposal through the drain line 29. It is obvious of course, that the end of the header line 17 opposite the diaphragm valve assembly 20 is capped or otherwise closed to prevent leakage of gas in the reverse direction.

If the opening 44 is sufficiently small and/or the pipe 29 sufficiently long to restrict the flow of gas, a pressure differential will build up across opening 44 or across drain pipe 29 sufficient to actuate a motor valve and to close valve 27 against its seat 28. However, it is preferable to employ a flow constricting member such as member 30 as hereinbefore described.

While it is preferred to employ a diaphragm operated motor valve as valve 20, I do not wish to be limited thereto since other standard means for actuating the valve may be employed. The valve may be pneumatically operated via pilot valve, the pilot valve being operated by pressure increase in the drain line. The motor valve may also be an electrically operated valve and operated in response to pressure changes in the drain line. However the preferred valve is the diaphragm valve operated directly from drain line pressure.

The valve 19 in a short conduit provides means for admitting antifreeze solution to the reservoir 18 when needed.

While certain embodiments of the invention have been described for illustrative purposes, the invention is obviously not limited thereto.

I claim:

1. A liquefied petroleum gas storage system comprising a pressure storage vessel, a pressure relief valve disposed in communication with the vapor space of said vessel, an exhaust conduit in communication with the outlet of said relief valve, a drainage conduit in communication with said exhaust conduit, a motor valve in said drainage conduit to control the flow of fluid therethrough, said motor valve being adapted to close in response to an increase of pressure in said drainage conduit intermediate said motor valve and said exhaust conduit.

2. In the system of claim 1 wherein said motor valve is a diaphragm operated motor valve.

3. A liquefied petroleum gas storage system comprising a pressure storage vessel, a pressure relief valve disposed in communication with the vapor space of said vessel, an exhaust conduit in communication with the outlet of said relief valve, a drainage conduit communicating with said exhaust conduit, a motor valve in said drainage conduit, a flow constricting member in said drainage conduit intermediate said motor valve and said exhaust conduit, said motor valve being adapted to operate in response to pressure in said drainage conduit intermediate said exhaust conduit and said flow constricting member.

4. In the system of claim 3 wherein the motor valve is a diaphragm operated valve.

5. In the system of claim 3 wherein the motor valve is adapted to close upon increase of fluid pressure in said drainage conduit intermediate said exhaust conduit and said flow constricting member.

6. A liquefied petroleum gas storage system comprising a pressure storage vessel, a pressure relief valve disposed in communication with the vapor containing space of said vessel, an exhaust conduit in communication with the outlet of said relief valve, a drainage conduit in the body of said relief valve extending from the outlet end thereof to the exterior of the valve for drainage of liquid, a further liquid drainage conduit extending from said drainage conduit in the body of said relief valve to a point remote from said pressure storage vessel, and a motor operated valve in said further liquid drainage conduit to control the flow of fluid therethrough.

7. In the system of claim 6 wherein said motor operated valve is closed in response to increase in pressure in said further liquid drainage conduit intermediate said motor operated valve and said drainage conduit in said relief valve body.

8. In the system of claim 6 wherein a fluid flow constricting member is disposed in said further liquid drainage conduit intermediate said motor operated valve and said drainage conduit in said relief valve and said motor operated valve is adapted to close in response to increase in pressure in said further liquid drainage conduit intermediate said flow constricting member and said drainage conduit in said relief valve body.

9. A relief valve vent system comprising in combination a pressure relief valve having an inlet and an outlet, a vent stack having an outlet and an inlet, said vent stack inlet being disposed in communication with said relief valve outlet, a drain conduit connected in communication with said stack, a motor valve in said drain conduit disposed to control the flow of fluid therethrough, said motor valve comprising a shut off valve, means normally biasing said shut off valve open, a fluid motor disposed to overpower said biasing means and close said shut off valve, and a fluid supply conduit connecting said stack in communication with said motor to supply fluid under pressure from said stack to operate said motor.

10. A relief valve vent system comprising in combination a vent stack having an inlet and an outlet, said inlet being adapted to be connected in communication with the outlet of a pressure relief valve, a drain conduit connected in communication with said stack, a motor valve in said drain conduit disposed to control the flow of fluid therethrough, said motor valve comprising a shut off valve, means normally biasing said shut off valve open, a fluid motor disposed to overpower said biasing means and close said shut off valve, and a fluid supply conduit connecting said stack in communication with said motor to supply fluid under pressure from said stack to operate said motor.

11. A liquefied petroleum gas storage system comprising a pressure storage vessel, a pressure relief valve disposed at least in part in said vessel and in the portion of said vessel normally containing vapor, an exhaust conduit in communication with the outlet of said relief valve, a drainage conduit in communication with said exhaust conduit, and a motor valve in communication with said drainage conduit to control the flow of said petroleum gas therethrough.

12. A liquefied petroleum gas storage system comprising a pressure storage vessel, a pressure relief valve disposed at least in part in said vessel and in the portion of said vessel normally containing vapor, an exhaust conduit in communication with the outlet of said relief valve, a drainage conduit in communication with said exhaust conduit, a motor valve in said drainage conduit to control the flow of fluid therethrough, said motor valve being adapted to close in response to an increase of pressure in said drainage conduit intermediate said motor valve and said exhaust conduit.

13. A liquefied petroleum gas storage system comprising a pressure storage vessel, a pressure relief valve extending into the space of said vessel normally containing vapor, an exhaust conduit in communication with the outlet of said relief valve, a drainage conduit communicating with said exhaust conduit, a motor valve in said drainage conduit, a flow constricting member in said drainage conduit intermediate said motor valve and said exhaust conduit, said motor valve being adapted to close in response to increase in pressure in said drainage conduit intermediate said exhaust conduit and said flow constricting member.

14. A relief valve vent system comprising, in combination, a pressure relief valve having an inlet and an outlet, a vent stack having an outlet and an inlet, the vent stack inlet being disposed in communication with said relief valve outlet, a drainage conduit connected in communication with said stack, a motor valve in said drainage conduit disposed to control the flow of fluid therethrough, a constriction in said drainage conduit intermediate said motor valve and said vent stack, said motor valve comprising a shut-off valve, means normally biasing said shut-off valve open, a fluid motor disposed to override said biasing means and close said shut-off valve, a fluid supply conduit connecting said drainage conduit intermediate said constriction and said vent stack in communication with said motor to supply fluid under pressure from said conduit to operate said motor.

References Cited in the file of this patent

UNITED STATES PATENTS

| | | |
|---|---|---|
| 644,259 | Ostergren | Feb. 27, 1900 |
| 2,049,239 | Wilcox | July 28, 1936 |
| 2,509,879 | Pelton | May 30, 1950 |
| 2,551,435 | Grogan | May 1, 1951 |